US010338557B2

(12) United States Patent
Dotson

(10) Patent No.: US 10,338,557 B2
(45) Date of Patent: Jul. 2, 2019

(54) SYSTEMS AND METHODS FOR SAFETY INPUT DEVICES

(71) Applicant: ROCKWELL AUTOMATION TECHNOLOGIES, INC., Mayfields Heights, OH (US)

(72) Inventor: Gary D. Dotson, Muskego, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 54 days.

(21) Appl. No.: 15/627,066

(22) Filed: Jun. 19, 2017

(65) Prior Publication Data
US 2018/0364670 A1 Dec. 20, 2018

(51) Int. Cl.
G05B 19/042 (2006.01)
G05B 19/048 (2006.01)
H01H 19/64 (2006.01)
G05B 9/02 (2006.01)
G05D 1/00 (2006.01)

(52) U.S. Cl.
CPC .......... G05B 19/0428 (2013.01); G05B 9/02 (2013.01); G05B 19/048 (2013.01); H01H 19/64 (2013.01); G05B 2219/39447 (2013.01); G05B 2219/50198 (2013.01); G05D 1/00 (2013.01)

(58) Field of Classification Search
None
See application file for complete search history.

(56) References Cited

U.S. PATENT DOCUMENTS

| 4,490,660 A * | 12/1984 | Tsuchihashi | B25J 19/023 250/559.33 |
| 7,337,369 B2 * | 2/2008 | Barthel | G05B 19/4185 714/43 |
| 9,349,546 B2 * | 5/2016 | Dotson | H01H 3/022 |
| 10,020,151 B2 * | 7/2018 | Prosak | H01H 50/00 |
| 2003/0158615 A1 * | 8/2003 | Weber | B65G 37/02 700/96 |
| 2003/0206099 A1 * | 11/2003 | Richman | G08B 13/19608 340/506 |
| 2006/0026672 A1 * | 2/2006 | Braun | G05B 19/042 726/9 |

(Continued)

FOREIGN PATENT DOCUMENTS

EP 1716982 A1 11/2006

OTHER PUBLICATIONS

Extended European Search Report for 18169580.0 dated Oct. 31, 2018, 11 pages.

*Primary Examiner* — Ramesh B Patel
(74) *Attorney, Agent, or Firm* — Fletcher Yoder P.C.

(57) ABSTRACT

A system includes a safety controller that, in operation, interrupts power to industrial automation devices or puts the system into a safe state upon command of a human operator. The system also includes an emergency stop switch circuit actuatable by a human operator and a human machine interface in data communication with the safety controller and the emergency stop switch circuit. The human machine interface includes integrated safety circuitry that, in operation, detects a change of state of the emergency stop switch circuit and provides a signal to the safety controller to interrupt power to the industrial automation devices or put the system into a safe state.

20 Claims, 4 Drawing Sheets

(56) References Cited

U.S. PATENT DOCUMENTS

| | | | |
|---|---|---|---|
| 2007/0168077 A1* | 7/2007 | Schuster | G05B 19/4061 700/170 |
| 2008/0313006 A1* | 12/2008 | Witter | G06Q 10/063118 705/7.17 |
| 2010/0238019 A1* | 9/2010 | Richman | G08B 13/19656 340/521 |
| 2014/0211358 A1* | 7/2014 | Dotson | H01H 3/022 361/115 |
| 2014/0244003 A1* | 8/2014 | Scott | G05B 15/02 700/56 |
| 2014/0244004 A1* | 8/2014 | Scott | B25J 9/1676 700/56 |
| 2014/0244036 A1* | 8/2014 | Scott | G05B 15/02 700/253 |
| 2014/0244037 A1* | 8/2014 | Scott | B25J 9/1694 700/253 |
| 2014/0277613 A1* | 9/2014 | Love | A63J 1/02 700/83 |
| 2015/0213369 A1* | 7/2015 | Brandt | H04L 63/1408 706/12 |
| 2016/0136814 A1 | 5/2016 | Garde | |
| 2016/0203282 A1 | 7/2016 | Azizian et al. | |

* cited by examiner

SYSTEMS AND METHODS FOR SAFETY INPUT DEVICES

BACKGROUND

The invention relates generally to the field of automation systems. More specifically, the present application relates to safety input devices for automation systems.

Many automation systems utilize safety input devices. For example, the safety input devices may be used as part of a safety control system within an automation system. For mobile devices that include safety input devices, discrete tether wiring is typically used to connect the safety input devices to a safety control system via a local safety input/output (I/O) module and/or a local safety controller. Additionally, on-machine safety input devices typically have a wired connection to a local safety I/O module and/or a local safety controller. That is, safety input devices generally call for a safety controller, and/or a safety I/O module dedicated to the safety input devices in order to function. Therefore, it may be desirable to allow for safety input devices to function without using wiring, a dedicated safety controller, and/or safety I/O modules.

BRIEF DESCRIPTION

In a first embodiment, a system includes a safety controller that, in operation, interrupts power to industrial automation devices or puts the system into a safe state upon command of a human operator. The system also includes an emergency stop switch circuit actuatable by a human operator and a human machine interface in data communication with the safety controller and the emergency stop switch circuit. The human machine interface includes integrated safety circuitry that, in operation, detects a change of state of the emergency stop switch circuit and provides a signal to the safety controller to interrupt power to the industrial automation devices or put the system into a safe state.

In another embodiment, a system includes a human machine interface that, in operation, is in data communication with a safety controller and to an emergency stop switch circuit. The human machine interface includes integrated safety circuitry that, in operation, detects a change of state of the emergency stop switch circuit and provides a signal to the safety controller to interrupt power to the industrial automation devices or put the industrial automation devices into a safe state.

In yet another embodiment, a method includes receiving, in integrated safety circuitry of a human machine interface, a stop signal from an emergency stop circuit actuated by a human operator. The method also includes communicating a safety signal from the integrated safety circuitry to a safety controller of an automation system based upon the received stop signal and interrupting power to automation devices or putting the automation system into a safe state via the safety controller based upon the safety signal.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

Automation systems often utilize safety input devices such as human-machine interfaces. For example, the safety input devices may be used as part of a safety control system within an automation system that is used to alter operation of the automation system. For mobile devices (e.g., tablets) that include safety input devices, discrete tether wiring is typically used to connect the safety input devices to a safety control system via a local safety input/output (I/O) module and/or a local safety controller. Additionally, on-machine safety input devices typically have a dedicated wired connection to a local safety I/O module and/or a local safety controller. That is, safety input devices generally call for a safety controller, and/or a safety I/O module in order to function. The presently disclosed techniques allow for safety input devices to be connected to automation systems without using dedicated discrete wiring to the safety input device. Moreover the techniques disclosed herein allow for safety input devices to be connected to automation system without a local safety I/O module or a local safety controller. In other words, the presently disclosed techniques enable the elimination of the discrete wiring, safety I/O module, and safety controller that are specifically dedicated to safety input devices.

Figure 1:
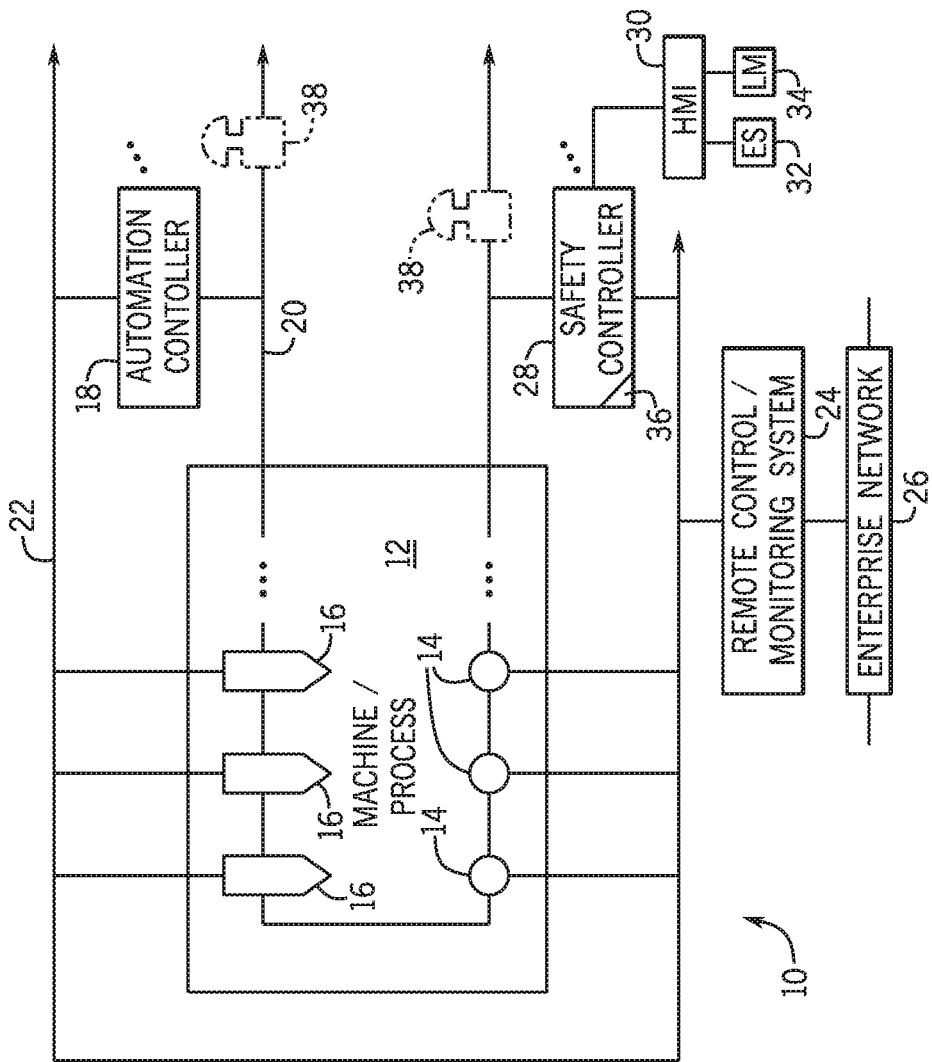
FIG. 1 is a schematic diagram of an automation system, in accordance with embodiments described herein.

By way of introduction, FIG. 1 is a schematic diagram of an automation system 10. The automation system 10 allows for control and/or monitoring of a machine/process 12. The machine/process 12 may take many forms and include devices for accomplishing many different and varied purposes. For example, the machine/process 12 may include a manufacturing line or station, a material handling system, an assembly process, a compressor station, an oil refinery, a batch operation for making food items, or any mechanized and automated system. Accordingly, the machine/process 12 may include a variety of operational components, such as electric motors, motor drives and controllers, sensors and instrumentation, actuators, feedback devices, automation controllers, computers, and so forth. In particular, the machine/process 12 will typically include control and monitoring equipment for regulating process variables through automation and/or monitoring.

For example, the illustrated machine/process 12 has actuators 14 and sensors 16. The actuators 14 include one or more devices adapted to perform a mechanical action in response to a signal from an automation controller 18, such as motors and associated drives. The sensors 16 include one or more devices that provide information regarding the operation and/or conditions of the machine/process 12 to the automation controller 18, such as for monitoring, open and closed-loop control, and so forth. The sensors 16 and actuators 14 serve to allow automation of the machine/process 12 in accordance with programming or protocols implemented by the automation controller 18. Indeed, the sensors 16 and actuators 14 may be utilized within any number of preset process loops that are monitored and controlled by the automation controller 18 or any other control and/or monitoring equipment located locally to the system or remotely (e.g., enterprise systems, remote monitoring systems, etc.). Such process loops may be activated based on process inputs (e.g., input from one of the sensors 16) or direct operator input (e.g., input received via a human-machine interface associated with the automation controller 18). It should additionally be noted that the automation system 10 may include more than one automation controller 18, and these may operate independently or inter-dependently in accordance with the nature and operation of the system/process.

Components of the automation system 10 such as the machine/process 12, actuators 14, sensors 16, and automation controller 18 may be coupled to and/or in communication with a power network 20 and a data network 22. The power network 20 supplies electric power (e.g., three-phase alternating current electric power) to the automation system 10 and various components of the automation system 10. The data network 22 may be used to send and receive data. For example, data from the sensors 16 is relayed to the automation controller 18, and commands from the automation controller 18 are sent to the actuators 14 via the data network 22. Additionally, the data network 22 may be a wireless network.

Other systems may be used to monitor and/or control that automation system 10 and components thereof (e.g., the machine/process 12). For instance, a remote control/monitoring system 24 receives data regarding the automation system 10 via the data network 22 and control the machine/process 12 based on the received data. More specifically, the remote control/monitoring system 24 can send commands that change operational parameters of the actuators 16 of the machine/process 12.

The remote control/monitoring system 24 may also be communicatively coupled to an enterprise network 26. The enterprise network 26 may include other machines and/or processes, groupings of machines and/or processes, and/or networks of automation machines and/or automated devices. The enterprise network 26 may also include a data network that is used to transmit data regarding with the automation system 10 to other systems with which the automation system 10 may be associated. For instance, the automation system 10 may be part of a larger system or process, and the enterprise network 26 may be used to transmit data throughout the larger system or process. Data from the other systems and/or the larger system may also be received by the enterprise network 26. Similar to the data network 22, the enterprise network 26 may include a wireless network.

The automation system 10, as illustrated, also includes one or more safety controllers 28. The safety controller 28, which is coupled to the power network 20 and data network 22, monitors data associated with the automation system 10 as well as the components of the automation system 10 (e.g., machine/process 12). Moreover, the safety controller 28 may effect changes based on the received data. For example, in response to signals indicative of certain conditions such as signals generated by operator input, the safety controller 28 may interrupt the flow of electric power to the machine/process 12 and/or put the automation system 10 or components thereof into a safe state. Additionally, as discussed below, the safety controller 28 can also change operational characteristics of the automation system 10 based on operator input. Furthermore, the safety controller 28 may be remotely located on the machine/process 12.

As shown, the safety controller 28 is communicatively coupled to a human-machine interface (HMI) 30 that displays information to an operator as well as receives operator input. More specifically, the HMI 30 may send and receive data to and from the safety controller 28 via the data network 22. For instance, in this embodiment, the HMI includes emergency stop circuitry such as an emergency stop (E-stop) 32 (e.g., a push-button) and/or a live-man switch 34, which, depending on the embodiment, may also be known as a three-position enable switch or a grip switch. The E-stop 32 and live-man switch 34 can be utilized by an operator to provide input, such as input indicative of a request to shut down the machine/process 12 and/or the automation system 10. For instance, in embodiments in which the E-stop 32 is a push-button, the operator may press (or in some embodiments, pull) the push-button, the safety controller 28 may determine that the pressing of the push-button is indicative of a request to shut down the automation system 10, and the safety controller 28 may cause the automation system 10 to shut down (e.g., via interrupting the flow of power to automation system 10).

As discussed below, in some embodiments, the HMI 30 may be a wireless device that communicates with the safety controller 28 wirelessly, while in other embodiments, the HMI 30 may be a wired device that communicates with the safety controller 28 via a wired connection. In embodiments in which the HMI 30 is wired, it should be noted that the HMI 30 is wired to the safety controller 28 without using a wire dedicated to the transmission of safety data and/or signals. As will also be discussed below, the HMI 30 may also include circuitry that recognizes operator input as being indicative of a request to interrupt the operation of the automation system 10 and send a signal to the safety controller 28 to interrupt power to the automation system 10 and/or components thereof (e.g., the machine/process 12) or put the automation system 10 into a safe state.

As illustrated, the safety controller 28 also includes a profile 36. The profile 36 may be software or instructions that are be stored on memory circuitry included within and/or accessible by the safety controller 28 and executed by a processor associated with the safety controller 28. More specifically, the profile 36 allows for signals from the HMI 30 to be interpreted and/or implemented by the safety controller 28. For example, the profile 36 enables recognition of the circuitry associated with the HMI 30 and allows for signals from the HMI 30 to interrupt the flow of power to the automation system 10 or put the automation system 10 into a safe state. More specifically, the profile 36 may enable recognition of signals that are sent from the HMI 30 as a result of an operator input via the E-stop 32 and/or the live-man switch 34. For example, the profile 36, when executed by the safety controller 28, enables the safety controller 28 to determine that the signal is indicative of a request to interrupt power to the automation system 10 or put the automation system 10 into a safe state as well as to permit the safety controller 28 to cause an interruption to the power to the automation system 10 and/or components of the automation system 10 or put the automation system 10 into a safe state. For instance, the safety controller 28 may send a signal that causes power from the power network 20 to not reach the machine/process (e.g., break a circuit).

The automation network 10 also includes E-stops 38 that are not included in the HMI 30. As illustrated, the E-stops 38 may be push-buttons. When used, the E-stops 38 cause power to the automation system 10 and/or components of the automation system 10 such as the machine/process 12 to be interrupted or cause the automation system 10 or components thereof to be put into a safe state. For example, when an operator utilizes an E-stop 38, the E-stop could cause an interruption to the power network 20. Use of the E-stops 38 may also cause a signal to be sent via the data network 22 to the automation controller 18 or the safety controller 28, and in response, the automation controller 18 and/or safety controller 28 may change the operating parameters of the machine/process 12 or automation system 10 to put the automation system 10 or components of the automation system 10 into a safe state.

Figure 2:
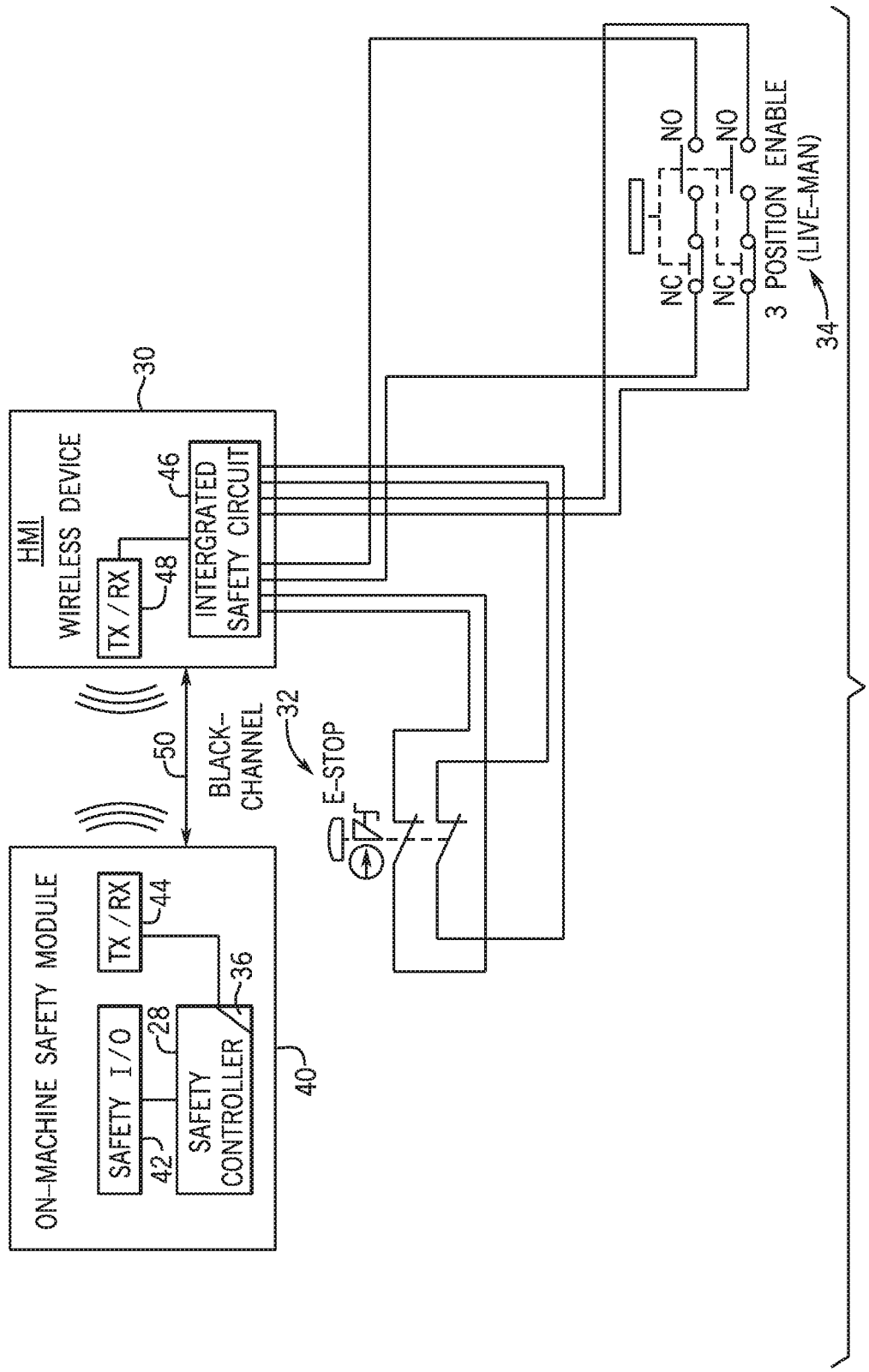
FIG. 2 is a schematic diagram of an on-machine safety module and a human-machine interface that may be included in the automation system of FIG. 1, in accordance with embodiments described herein.

Continuing with the drawings, FIG. 2 is a schematic diagram of an on-machine safety module 40 and HMI 30 that may be included in an automation system, such as the automation system 10. The on-machine safety module 40 may be located on the machine/process 12. As discussed below, the HMI 30 communicates with components of the safety module 40 without using a communication means that is dedicated to communicating safety information and/or signals to and from the HMI 30. In other words, the techniques described in the illustrated embodiment may be used to remove independent communication means (e.g., a discrete cable) typically used to transmit data from a safety input device such as an HMI to the machine associated with the HMI.

As illustrated, the on-machine safety module 40 includes several components. For instance, the on-machine safety module 40 includes an optional safety I/O module 42, a transmitter/receiver 44, and a safety controller 28. The transmitter/receiver 44 may be a microprocessor that is configured to transmit and/or receive data from the HMI 30, and the transmitter/receiver 44 may be integrated into the safety controller 28. The transmitter/receiver function is discussed in greater detail below.

The safety controller 36 receives data from the transmitter/receiver 44. Additionally, actuators 14 and sensors 16 may be communicatively coupled to a safety I/O module 42, and the safety controller 28 may send and receive data to and from the actuators 14 and sensors 16 via the safety I/O module 42. However, while communication between components of the automation 10 and the safety controller 28 may be conducted via the I/O module 42, it should be noted that such a technique is strictly optional. For instance, in some embodiments, the transmitter/receiver 44 may be included within the safety controller 36 and receive and transmit data to and from components of the automation system 10. Accordingly, the safety I/O module 42 is not specifically needed to communicate with the HMI 30.

As described above, the safety controller 28 may receive and monitor data related to an automation system (e.g., automation system 10) and/or components or devices thereof. As described below, the safety controller 28 may interrupt power to the components and devices of the automation system 10 or put the automation system 10 into a safe state based on operator input (e.g., operator input made via the HMI 30).

The HMI 30 also includes several components. As illustrated, the HMI 30 includes an integrated safety circuit 46 that is communicatively coupled to an E-stop 32, a live-man switch 34, and a transmitter/receiver 48. The integrated safety circuit 46 detects changes regarding the E-stop 32 and the live-man switch 34 and sends signals to the safety controller 28 based on the changes. More specifically, the integrated safety circuit 46 may detect a change in a state of the E-stop 32 and/or the live-man switch 34 and/or receive a signal from the E-stop 32 and/or the live-man switch 34 and provide a signal to the safety controller 28 to interrupt power to the machine/process 12 and/or other machines, processes, and/or devices associated with the automation system 10 based on the detected change.

Referring specifically to the emergency stop circuitry that is included in the HMI 30, the E-stop 32 and the live-man switch 34 may each include circuitry that enable the E-stop 32 and live-man switch 34 to cause electric power (e.g., power provided by the power network 20) to be interrupted to the automation system 10 and/or the machine-process 12. For instance, the E-stop 32 and the live-man switch 34 may include circuitry, such as switches (e.g., contact switches), that when actuated cause a signal (e.g., electrical signal) to be sent to the integrated safety circuit 46. As a more specific example, the live-man switch 34 may include contacts with default states. That is, some contacts that are normally open ("NO") and other contacts that are normally closed ("NC"). An operator may actuate the live-man switch 34 (i.e., cause a change in state of one or more of the contacts from a default state (e.g., change a normally open contact to a closed position)), which causes the machine/process 12 to operate and/or receive electrical power.

In the illustrated embodiment, the live-man switch 34 is a three position enabling device, which means the live-man has three positions. For example, the live-man switch 34 may be a device that has a grip or trigger switch with three positions, and each of the positions may correspond to a state of the contacts in the circuitry of the live-man switch 34. For instance, a default state of live-man (e.g., no power to machine/process 12) may exist at the first and third positions. The first state may correspond to when the grip or trigger switch has no pressure applied to it by the operator. A second position may correspond to when the operator grips the grip or trigger switch, which may cause a change in state of the circuitry of the live-man switch 34 (e.g., cause some of the contacts to open or close). The third state may correspond to when the operators grips the grip or trigger switch with a certain amount of pressure that is greater than that applied to cause the second state to occur. As another example, the E-stop 32 may include one or more contacts that are normally open. An operator may press, pull, or otherwise actuate the E-stop 32 to cause the contacts to close (e.g., complete a circuit).

In any case, each state of the E-stop 32 or the live-man switch 34 may cause various signals to be sent to the integrated safety circuit 46, and at least one state of each the E-stop 32 and the live-man switch 34 causes a signal to be sent to the integrated safety circuit 46 that corresponds to operator input (e.g., actuation of the E-stop 32 or live-man switch 34) associated with a request to interrupt power to the automation system 10 and/or the machine/process 12. For instance, when an operator actuates the push-button 32, a signal may be sent to the integrated safety circuit 46, which may send a signal to the safety controller 28 to interrupt power to the machine/process 12 or automation system 10 or put the machine/process 12 or automation system 10 into a safe state. Moreover, the integrated safety circuit 46 may also detect the states of the E-stop 32 and the live-man switch 34 based on the signals received from the E-stop 32 and the live-man switch 34. The integrated safety circuit 46 may send a signal to the safety controller 28 to interrupt power to the automation system 10 or components thereof (e.g., the machine/process 12) or put the automation system 10 or components thereof into a safe state based on the detected states of the E-stop 32 and the live-man switch 34. Additionally, as discussed below, in certain embodiments, the integrated safety circuit 46 includes more than one processor that are be used make determinations of the states of the E-stop 32 and the live-man switch 34 as well as determinations of the signals send by the E-stop 32 and the live-man switch 34.

More specifically, a signal from the integrated safety circuit 46 may be sent to the safety controller 28 via the transmitter/receiver 48 and received by the transmitter/receiver 44 and safety controller 28, wherein the profile 36 may be executed to determine that the signal is indicative of a request to terminate or otherwise interrupt power to the automation system 10 or the machine/process 12 or to put the automation system 10 or the machine/process 12 into a safe state. More specifically, the signal may be transmitted from the HMI 30 to the on-machine safety module 40 wirelessly or through a wired connection, such as via black-channel communication 50. Black-channel communication 50 refers to communication of the signals (e.g., signal to interrupt power to the automation system 10) as well as data associated with the automation system 10 that occurs via the same means. In other words, the black-channel communication 50 refers to a communication technique that does not include communication specific to sending safety information or signals, such as the signals to interrupt power to the automation system 10. For example, black-channel communication 50 may include wireless communication (e.g., via a wireless network or Bluetooth), communication via an Ethernet cable (e.g., CAT 5e or CAT 6 cable), and/or communication via universal asynchronous receiver/transmitter (UART) communication. As such, the automation system 10 may be operated with a safety controller (e.g., safety controller 28) that is located remotely on a machine/process 12 of the automation system 10, including embodiments of the on-machine safety-module 40 that do not include the safety I/O module 42. In other words, the safety controller 28, which may be located on the machine/process 12, may control the automation system 10 based on input received from the HMI 30. For instance, input from the HMI 30 may cause signals to be transmitted via black channel communication 50 to the safety controller 28 of the on-machine safety module 40, and the safety controller 28 may send a signal that causes a change to operating parameters of the automation system 10 (e.g., put the automation system 10 or components thereof into a safe state).

Furthermore, the signals from the integrated safety circuit 46 to the safety controller 28 include time-stamped encrypted packets. That is, the integrated safety circuit 46 and the safety controller 28 communicate with one another via time-stamped encrypted packets. Additionally, it should be noted that the time-stamped encrypted packets conform to International Electrotechnical Commission (IEC) standard 61508 and accord with the Common Industrial Protocol (CIP).

Figure 3:
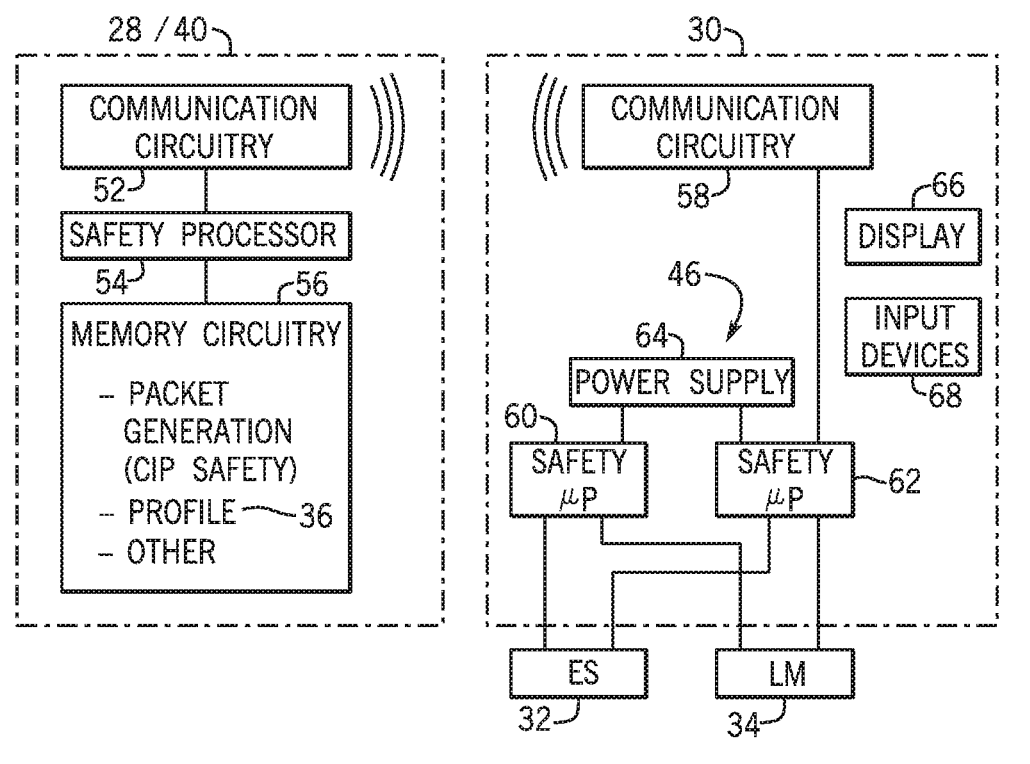
FIG. 3 is a schematic diagram of a human-machine interface and a safety controller or on-machine safety module, in accordance with embodiments described herein.
Figure 4:
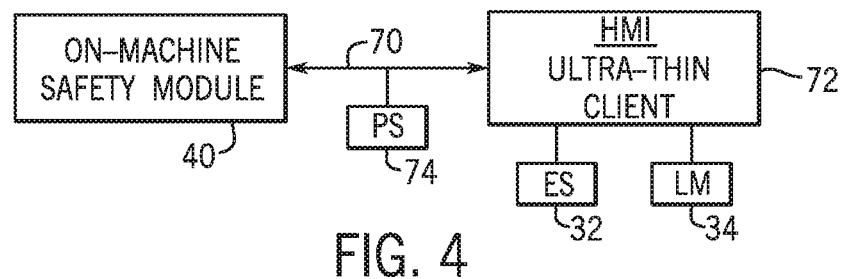
FIG. 4 is a schematic diagram of a portion of a human-machine interface and a safety controller or on-machine safety module, in accordance with embodiments described herein.
Figure 5:
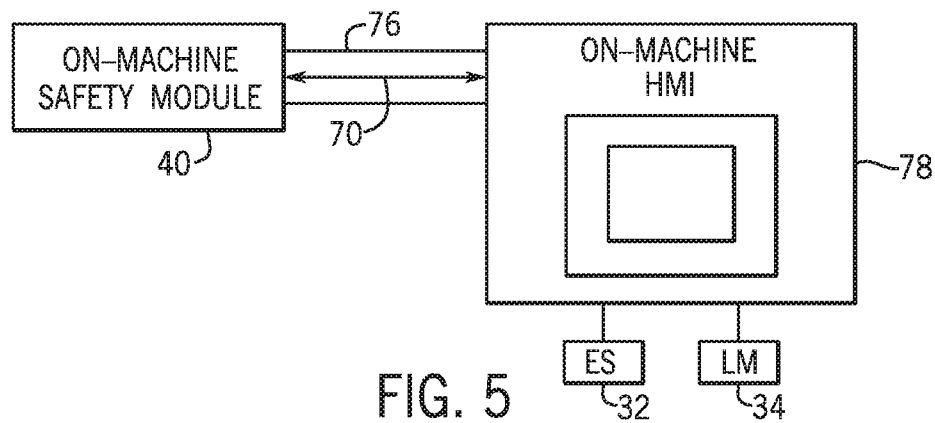
FIG. 5 is a schematic diagram of a human-machine interface and a safety controller or on-machine safety module, in accordance with embodiments described herein.

FIGS. 3-5 illustrate different embodiments in which the HMI 30 may communicate with the safety controller 28 and/or on-machine safety module 40 in the same manner or a manner similar to the manner discussed above in relation to FIG. 2. FIG. 3 is a schematic diagram of an embodiment of the HMI 30 and the safety controller 28 or the on-machine safety module 40. More specifically, the safety controller 28/on-machine safety module 40 includes communication circuitry 52, a safety processor 54, and memory circuitry 56. The HMI 30 include communication circuitry 58, two safety microprocessors 60, 62, the E-stop 32, the live-man switch 34, a power supply 64, a display 66, and input devices 68.

First focusing on the HMI 30, the safety microprocessors 60, 62 may work in conjunction to determine actuation of the E-stop 32 and live-man switch 34 by an operator. Using two safety microprocessors 60, 62 is one example of how to implement the integrated safety circuit 46 and perform the same functions as the integrated safety circuit 46 discussed above. For instance, one or both of the safety microprocessors 60,62 may determine that the E-stop 32 and/or live-man switch 34 has been actuated and send a signal to the safety controller 28/on-machine safety module 40 to interrupt power to the automation system 10 or components thereof. Moreover, the safety microprocessors 60, 62 may receive a signal from the E-stop 32 or the live-man switch 34 indicating that the operator has actuated the E-stop 32 of the live-man switch 34 and send a signal to the safety controller 28/on-machine safety module 40 to interrupt the flow of electric power to the automation system 10 or the machine/process 12 or put the automation system 10 and/or components of the automation system 10 into a safe state. The safety microprocessors 60, 62 may also determine whether the signals generated by the E-stop 32 and the live-man switch 34 should be communicated to the safety controller 28/on-machine safety module 40. It should also be noted that while the illustrated embodiment includes two safety microprocessors 60, 62, the HMI 30 may include less than two microprocessors (e.g., one microprocessor) or more than two microprocessors (e.g., three, four, five, or more microprocessors) in other embodiments to attain the desired safety integrity level.

The communication circuitry 52, 58 enables communication between the HMI 30 and the safety controller 28/on-machine safety module 40. The communication occurs via time-stamped encrypted packets that conform to IEC standard 61508. The communication may occur wirelessly (e.g., via a wireless network), and the wireless communication may be black-channel communication (e.g., black-channel communication 50). For instance, an operator may actuate the E-stop 32 or the live-man switch 34, causing a signal to be sent to the safety microprocessors 60, 62. The safety microprocessors 60, 62 may send a signal that includes time-stamped encrypted packets via the communication circuitry 58 to the safety controller 28/on-machine safety module 40, which receives the signal via the communication circuitry 52. The signal may be processed by the safety processor 54. For instance, the safety processor 54 may execute instructions stored on the memory circuitry 56 such as the profile 36. The profile 36 may include instructions that, when executed, enable the safety processor 54 of the safety controller 28/on-machine safety module 40 to recognize the safety microprocessors 60, 62 as well as the signals generated by the safety microprocessors 60, 62. For instance, the profile 36 may enable the safety processor 54 to recognize a signal from the safety microprocessors 60, 62 as being indicative of a request or command to stop or interrupt the flow of electric power to the automation system 10 and/or components of the automation system 10 (e.g., machine/process 12) or put the automation system 10 or components thereof into a safe state.

The power supply 64 supplies power to the safety microprocessors 60, 62. While the illustrated embodiment includes one power supply 64, it should be noted that other embodiments may include more than one power supply 64. For example, the microprocessors 60, 62 may be powered by separate, cross-monitored power supplies 64. The display 66 displays information concerning the automation system 10 and/or components of the automation system 10 to the operator. Additionally, the illustrated embodiment of the HMI 30 includes input devices 68 that the operator may use to make inputs into the HMI 30. In certain embodiments, such as embodiments in which the HMI 30 is a thin client or ultra-thin client or the screen 66 is a touchscreen, the screen 66 may function as an input device 68.

In addition to the profile 36, the memory circuitry 56 may also include instructions that enable the time-stamped encrypted packets to be generated. For instance, the instructions may be executed by the safety processor 54 such that the time-stamped encrypted packets are generated, and the time-stamped encrypted packets may be used for communication between the safety controller 28/on-machine safety module 40 and the HMI 30. The memory circuitry 56 may also include other data or instructions. For instance, the memory circuitry 56 may include data related to the operational history of the automation system 10 and/or the safety controller 28/on-machine safety module 40.

FIG. 4 is a schematic diagram of another embodiment of the on-machine safety module 40 and an HMI 72. The HMI 72 is an ultra-thin client that includes the E-stop 32 and the live-man switch 34. FIG. 5 is a schematic diagram of yet another embodiment of the on-machine safety module 40 and an HMI 78. The HMI 78 is an on-machine HMI that is supported via a support 76 by the same machine of the automation system 10 as the on-machine safety module 40. As discussed above, the on-machine safety module 40 may include the safety controller 28. Accordingly, the HMI 78 may be supported on the same machine as the safety controller 28.

While illustrated as including the E-stop 32 and the live-man switch 34, the HMI 72 and HMI 78 may include any of the components discussed above with regard to the embodiments of HMI 30 of FIG. 2 and FIG. 3. Additionally, the HMI 72 and HMI 78 may communicate via a wired connection (e.g., a wire 70). The wired connection 70 allows for black channel communication (e.g., black channel communication 50) as discussed above. Referring specifically to FIG. 4, it should also be noted that a power supply 74 is included. The power supply 74 supplies power to the on-machine safety module 40 and/or the HMI.

While the embodiments discussed in the present disclosure include HMIs 30, 72, 78, E-stop 32, and the live-man switch 34, it should be noted that other safety input devices may be included and used in the automation system 10 to cause interruptions to power of the automation system 10 and/or components thereof (e.g., machine/process 12) or cause the automation system 10 or the machine/process 12 to enter into a safe state. For instance the automation system 10 may also include jog buttons, rotary controls, key switches, joysticks, alphanumeric keys, and the like.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system comprising:
a safety controller that, in operation, interrupts power to industrial automation devices or puts the system into a safe state upon command of a human operator;
an emergency stop switch circuit actuatable by a human operator;
a human machine interface in data communication with the safety controller and the emergency stop switch circuit, and comprising integrated safety circuitry that, in operation, detects a change of state of the emergency stop switch circuit and provides a signal to the safety controller to interrupt power to the industrial automation devices or put the system into a safe state; and
a live-man switch circuit coupled to the integrated safety circuitry, wherein the integrated safety circuitry, in operation, provides a signal to the safety controller to interrupt power to the industrial automation devices or put the system into a safe state based upon a signal from either the emergency stop switch circuit or from the live-man switch circuit.

2. The system of claim 1, wherein the safety controller comprises memory circuitry storing a profile for the integrated safety circuitry and, in operation, recognizes the integrated safety circuitry to permit interruption of power to the industrial automation devices or put the system into a safe state.

3. The system of claim 1, wherein the human machine interface comprises a wireless device that, in operation, communicates with the safety controller wirelessly.

4. The system of claim 1, wherein the human machine interface comprises a wired device that, in operation, communicates with the safety controller via a wired connection.

5. The system of claim 1, wherein the human machine interface comprises an on-machine monitor supported by a machine that also supports the safety controller.

6. The system of claim 1, wherein the safety controller and the integrated safety circuitry communicate via time-stamped encrypted packets.

7. The system of claim 6, wherein the time-stamped encrypted packets conform to International Electrotechnical Commission standard 61508.

8. The system of claim 1, wherein the integrated safety circuitry comprises one or more data processors that, in operation, determine actuation of the emergency switch circuit.

9. The system of claim 1, wherein the human machine interface comprises a display that displays information to an operator as well as receives operator input.

10. A system comprising:
a human machine interface that, in operation, is in data communication with a safety controller and to an emergency stop switch circuit, the human machine interface comprising integrated safety circuitry that, in operation, detects a change of state of the emergency stop switch circuit and provides a signal to the safety controller to interrupt power to the industrial automation devices or put the industrial automation devices into a safe state;

wherein the safety controller and the integrated safety circuitry communicate via time-stamped encrypted packets.

11. The system of claim 10, wherein the human machine interface comprises a wireless device that, in operation, communicates with the safety controller wirelessly.

12. The system of claim 10, wherein the human machine interface comprises a wired device that, in operation, communicates with the safety controller via a wired connection.

13. The system of claim 10, wherein the human machine interface comprises an on-machine monitor supported by a machine that also supports the safety controller.

14. The system of claim 10, wherein the integrated safety circuitry comprises one or more data processors that, in operation, determine actuation of the emergency switch circuit.

15. The system of claim 10, wherein the human machine interface comprises a display that displays information to an operator as well as receives operator input.

16. A method comprising:
   receiving, in integrated safety circuitry of a human machine interface, a stop signal from an emergency stop circuit actuated by a human operator;
   communicating a safety signal from the integrated safety circuitry to a safety controller of an automation system based upon the received stop signal; and
   interrupting power to automation devices or putting the automation system into a safe state via the safety controller based upon the safety signal;
   wherein the safety signal is communicated from the integrated safety circuitry to the safety controller via time-stamped encrypted packets.

17. The method of claim 16, comprising processing the stop signal via a plurality of processing circuits of the integrated safety circuitry to determine whether to communicate the safety signal to the safety controller.

18. The method of claim 16, wherein the human machine interface comprises a wireless device that, in operation, communicates with the safety controller wirelessly.

19. The method of claim 16, wherein the human machine interface comprises a wired device that, in operation, communicates with the safety controller via a wired connection.

20. The method of claim 16, wherein the human machine interface comprises a display that displays information to an operator as well as receives operator input.

* * * * *